(12) United States Patent
Veysoglu et al.

(10) Patent No.: US 11,398,676 B2
(45) Date of Patent: Jul. 26, 2022

(54) SYSTEMS AND METHODS OF CONTROLLING A DIRECT RADIATING ARRAY ANTENNA

(71) Applicant: THE BOEING COMPANY, Chicago, IL (US)

(72) Inventors: Murat Veysoglu, Cypress, CA (US); John Baldauf, Redondo Beach, CA (US); Louis R. Fermelia, Beverly Hills, CA (US); Daniel Mathews, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 335 days.

(21) Appl. No.: 16/587,217

(22) Filed: Sep. 30, 2019

(65) Prior Publication Data

US 2021/0098873 A1    Apr. 1, 2021

(51) Int. Cl.
*H01Q 3/22* (2006.01)
*H01Q 3/28* (2006.01)

(52) U.S. Cl.
CPC ............. *H01Q 3/22* (2013.01); *H01Q 3/28* (2013.01)

(58) Field of Classification Search
None
See application file for complete search history.

(56) References Cited

U.S. PATENT DOCUMENTS

| | | | |
|---|---|---|---|
| 7,392,011 B1 | 6/2008 | Jacomb-Hood | |
| 7,570,209 B2 | 8/2009 | Shi et al. | |
| 9,577,723 B1 | 2/2017 | Jesiolowski et al. | |
| 9,673,523 B2 | 6/2017 | Veysoglu et al. | |
| 10,243,276 B2 | 3/2019 | Ford et al. | |
| 2008/0205539 A1 | 8/2008 | Wang et al. | |
| 2019/0006769 A1 | 1/2019 | Huchard et al. | |

FOREIGN PATENT DOCUMENTS

| | | |
|---|---|---|
| EP | 2487800 A1 | 8/2012 |
| EP | 2487800 A9 | 10/2012 |
| EP | 3627621 A1 | 3/2020 |
| WO | 2018223979 A1 | 12/2018 |

OTHER PUBLICATIONS

Extended European Search Report for corresponding European Patent Application No. 20183267.2 dated Nov. 18, 2020 (7 pages).

*Primary Examiner* — Whitney Moore
(74) *Attorney, Agent, or Firm* — The Small Patent Law Group LLC; Philip S. Hof

(57) ABSTRACT

A system includes a direct radiating array antenna and one or more processors. The antenna includes an array of elements configured to radiate radiofrequency (RF) energy to form a beam having multiple frequency channels. The one or more processors are configured to generate an excitation plan for powering the elements to form the beam. The excitation plan assigns multiple corresponding beamforming coefficients to each element in a group of the elements. Each beamforming coefficient designates power allocated to the assigned element for radiating RF energy at an associated frequency channel. The excitation plan provides a substantially uniform power distribution among the elements in the group, and at least some of the elements in the group have different allocations of power among the multiple frequency channels of the beam than other elements in the group.

20 Claims, 5 Drawing Sheets

SYSTEMS AND METHODS OF CONTROLLING A DIRECT RADIATING ARRAY ANTENNA

FIELD

Examples of the present disclosure generally relate to antennas, and more particularly to systems and methods for controlling a direct radiating array antenna to form a multi-channel beam.

BACKGROUND

Phased array antennas, such as direct radiating array antennas, are used for line-of-sight communications and other applications. Phased array antennas are configured to transmit beams that can be electronically controlled or steered by varying the time-delay or phase of electrical signals to individual elements forming the array antenna without physically moving any mechanical parts. In applications in which power capacity may be limited and/or the antenna is used to transmit beams long distances, such as satellite and other space vehicle applications, it is desirable to efficiently operate the antenna. The phased array antennas include an array of elements that are individually powered to radiate radiofrequency (RF) energy at one or more frequencies, and the combination of the RF energy radiated by the elements forms the beam that is transmitted to a given target, such as a geographic region or another antenna.

The elements of a phased array antenna are typically not uniformly operated, and as a result, only a subset of the elements contribute to the formation of the beam. The phased array antenna is not efficiently operated because the resulting beam output from the antenna has a lower energy than the beam would have if a greater proportion of the elements were used to contribute to the beam formation. The efficiency could be improved by implementing a constraint that causes all of the elements in the antenna to operate in the same way (e.g., according to the same beamforming coefficients) such that all elements contribute to the beam formation. However, causing the elements to operate the same way generally degrades the quality of the beam by decreasing the antenna gain.

SUMMARY

A need exists for a system and method of more efficiently controlling a direct radiating array antenna in the formation of a beam having satisfactory quality and other characteristics. Further, a need exists for efficiently controlling a direct radiating array antenna to form a beam including multiple frequency channels directed to an intended target.

With those needs in mind, certain embodiments of the present disclosure provide a system that includes a direct radiating array antenna and one or more processors. The direct radiating array antenna includes a plurality of elements disposed in an array. The elements are configured to radiate radiofrequency (RF) energy to form a beam having multiple frequency channels. The one or more processors are configured to generate an excitation plan for powering the elements to form the beam. The excitation plan assigns multiple corresponding beamforming coefficients to each element in a group of the elements. Each beamforming coefficient designates power allocated to the assigned element for radiating RF energy at an associated frequency channel of the beam. The excitation plan assigns the beamforming coefficients to provide a substantially uniform power distribution among the elements in the group. At least some of the elements in the group have different allocations of power among the multiple frequency channels of the beam than other elements in the group.

In at least one embodiment, the excitation plan assigns the beamforming coefficients to provide the substantially uniform power distribution such that a sum of power allocated among the multiple frequency channels for radiating by a first element in the group is within a designated threshold range of a sum of power allocated among the multiple frequency channels for radiating by a second element in the group.

In at least one embodiment, the excitation plan provides different allocations of power among the frequency channels such that a first element in the group is allocated a greater power for radiating at a first frequency channel of the beam than the power allocated to a second element in the group for radiating at the first frequency channel.

In at least one embodiment, the group is a first group and the excitation plan partitions the elements in the array into the first group and a second group of multiple elements. The excitation plan assigns beamforming coefficients to the elements in the second group to provide a substantially uniform power distribution among the elements in the second group at a different power level than a power level distributed to the elements in the first group.

In at least one embodiment, the excitation plan assigns only one corresponding beamforming coefficient to each of multiple elements that define a single channel group. Each element in the single channel group is configured radiate RF energy at only one of the frequency channels of the beam according to the assigned beamforming coefficient.

Certain embodiments of the present disclosure provide a method for controlling a direct radiating array antenna to form a beam. The method includes receiving antenna information about the direct radiating array antenna. The antenna information identifies a number and arrangement of elements in the direct radiating array antenna. The elements are configured to radiate radiofrequency (RF) energy to form a beam having multiple frequency channels. The method also includes generating, via one or more processors, an excitation plan for powering the elements to form the beam based on the antenna information. The excitation plan assigns multiple corresponding beamforming coefficients to each element in a group of the elements. Each beamforming coefficient designates power allocated to the assigned element for radiating RF energy at an associated frequency channel of the beam. The excitation plan is generated to provide a substantially uniform power distribution among the elements in the group. At least some of the elements in the group have different allocations of power among the multiple frequency channels of the beam than other elements in the group.

Certain embodiments of the present disclosure provide a direct radiating array antenna that includes a plurality of elements disposed in an array and one or more processors. The elements are configured to radiate radiofrequency (RF) energy to form a beam having multiple frequency channels. The one or more processors are configured to generate an excitation plan for powering the elements to form the beam. The excitation plan assigns one or more beamforming coefficients to each of the elements designating power allocated to the assigned element for radiating RF energy at an associated frequency channel. The excitation plan assigns multiple beamforming coefficients to a first element in the array and multiple beamforming coefficients to a second element in the array to enable each of the first and second elements to concurrently radiate RF energy at least at a first frequency channel and a second frequency channel of the beam. The first element is allocated a greater power to radiate RF energy at the first frequency channel than the power allocated to the second element to radiate RF energy at the first frequency channel. A total power distributed to the first element for radiating RF energy is within a designated threshold range of a total power distributed to the second element.

DETAILED DESCRIPTION

Figure 1:
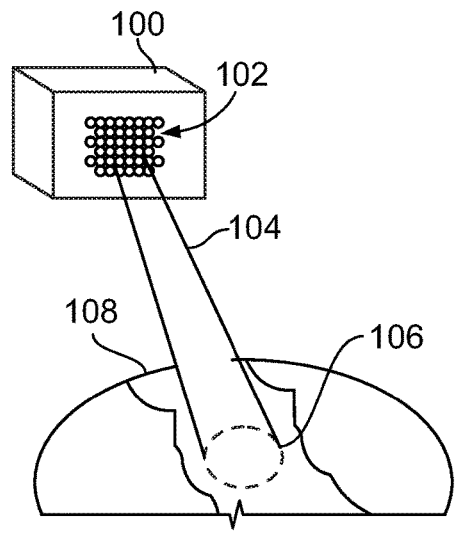
FIG. 1 illustrates a satellite that incorporates at least one direct radiating array (DRA) antenna according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide systems and methods for efficiently controlling a direct radiating array antenna to form a beam having multiple frequency channels, also referred to herein as a multi-channel beam. The direct radiating array (DRA) antenna includes an array of elements that are individually controller to radiate radiofrequency (RF) energy at designated frequency channels (e.g., frequencies). The combined RF energy generated by the elements forms the multi-channel beam. Some or all of the elements are controlled to concurrently radiate RF energy at multiple frequency channels. In one or more embodiments, power is uniformly distributed to the elements in the array (or a first group of elements in the array) such that the elements receive the same amount of total power for radiating RF energy. The elements, however, may be controlled to allocate that power differently among the multiple frequency channels.

In a non-limiting example, the elements may be configured to concurrently radiate at five different frequency channels. A first element receives the same amount of power (e.g., within a designated threshold range) as a second element to be used for radiating RF energy at the five frequency channels. The first element may be controlled to allocate 60% of the received power for radiating at a first frequency channel of the five channels and may partition the remaining 40% of the power for radiating at the second, third, fourth, and fifth frequency channels. The second element may be controlled to allocate 60% of the received power for radiating at the second frequency channel and may partition the remaining 40% for radiating at the first, third, fourth, and fifth frequency channels. Therefore, although the first and second elements are distributed the same amount of power, that power is allocated differently. The first element provides a greater contribution to forming the first frequency channel of the multi-channel beam than the second element because the first element radiates a greater amount of RF energy at the first frequency channel than the second element. Conversely, the second element provides a greater contribution to forming the second frequency channel of the multi-channel beam than the first element. Although the example above describes two elements that are controlled to allocate power differently from one another among the multiple frequency channels, dozens or hundreds of the elements in the array may have different power allocations among the frequency channels, while all receiving an equal distribution of power.

The respective power allocations to the elements of the array may be designated within an excitation plan that is generated by a control unit that includes one or more processors. The excitation plan assigns one or more beamforming coefficients to each of the elements. The beamforming coefficients provide designated settings for radiating the RF energy, such as, but not limited to, amplitude (e.g., power) and phase. For example, a given beamforming coefficient assigned to a first element may instruct the first element to radiate RF energy at an associated frequency with a designated power setting (or level) and phase setting. The control unit may generate the excitation plan by performing a beam planning algorithm utilizing various information as inputs including, for example, characteristics about the DRA antenna used to form the multi-channel beam, desired properties of the beam, and/or the like. The control unit optionally may be a part of the DRA antenna or may be part of a computing device that is separate and discrete from the DRA antenna. The DRA antenna may form (e.g., transmit) the multi-channel beam according to the excitation plan.

The systems and methods described herein enable efficient generation of multi-channel beams by a DRA antenna or other phased array antenna. For example, uniformly distributing power among the elements (of the entire array or at least a group thereof) provides balanced power loading for efficient operation of the antenna. Controlling at least some of the elements, which receive substantially uniform power distribution, to allocate that power differently among the multiple frequency channels from one another may desirably provide a satisfactory level of antenna gain. As a result, the systems and methods described herein enable efficient production of quality multi-channel beams via antenna arrays.

FIG. 1 illustrates a satellite 100 that incorporates at least one direct radiating array (DRA) antenna 102 according to an embodiment. The satellite 100 uses the DRA antenna 102 to form a beam 104 that is directed to a coverage area 106 on the earth 108. The coverage area may be a designated geographic region, such as a country. The beam 104 is a multi-channel beam that includes multiple different frequency channels within the beam 104. The DRA antenna 102 is controlled according to the systems and methods described herein such that the beam 104 is generated with greater power efficiency and/or have a greater quality (e.g., greater antenna gain) than at least some beams formed by array antennas controlled in a different manner. The satellite 100 optionally may include more than one DRA antenna 102. The satellite-based DRA antenna 102 represents one potential application, and the systems and methods described herein may be used for controlling operation of other DRA antennas located on other platforms built to carry an electronically scanning antenna, such as, but not limited to, stationary equipment, aircraft, unmanned aerial vehicles, trucks or other land-based vehicles, and/or the like. Although the embodiments are described herein with respect to DRA antennas, the systems and method described herein also may be used for controlling types of phased array antennas other than DRA antennas.

Figure 1A:
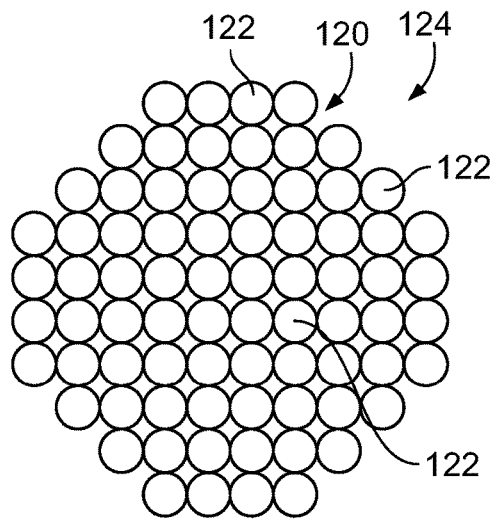
FIG. 1A illustrates an array of elements of a DRA antenna according to an embodiment of the present disclosure.

FIG. 1A illustrates an array 120 of elements 122 of a DRA antenna 124 according to an embodiment. The elements 122 in the array 120 are radiating elements that are configured to radiate (RF) energy to form a multi-channel beam that is transmitted by the DRA antenna 124 to a designated target, such as a coverage area or a specific receiving device. The array 120 in the illustrated embodiment is a two-dimensional tile array. The elements 122 are arranged side by side within the array 120 to define orthogonal rows and columns. The DRA antenna 124 may have any number of elements 122 in the array 120, such as dozens, hundreds, or even thousands of elements 122. As described herein, the elements 122 are individually controlled to radiate different portions of the multi-channel beam. For example, some elements 122 are controlled to radiate energy at different frequency channels than other elements 122. Some elements 122 are controlled to radiate energy at the same frequency channels as other elements 122, but with different amounts of energy among the frequency channels.

Figure 2:
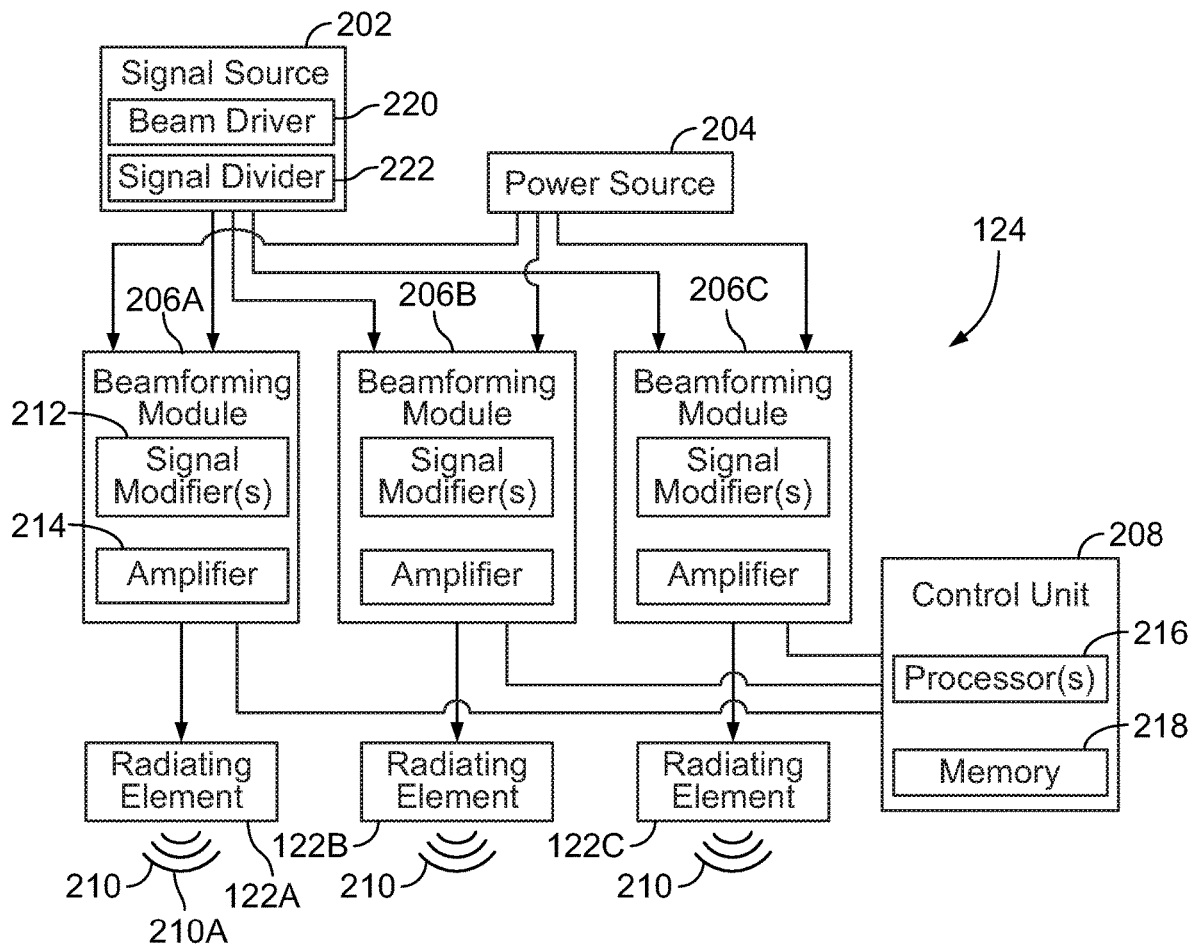
FIG. 2 is a block diagram of the DRA antenna according to an embodiment of the present disclosure.

FIG. 2 is a block diagram of a system 200 (e.g., a communication system) that includes the DRA antenna 124 and a control unit 208 according to an embodiment. The DRA antenna 124 in the illustrated embodiment includes a signal source 202, a power source 204, a plurality of the elements 122 configured to radiate RF energy, and a plurality of beamforming modules 206. The control unit 208 is operatively connected to the DRA antenna 124. For example, the control unit 208 may be electrically connected to control the operation of the DRA antenna 124. Optionally, the control unit 208 may be an integrated component of the DRA antenna 124, such that the control unit 208 is located at the DRA antenna 124. For example, the control unit 208 may be affixed to a chassis of the DRA antenna 124 and/or housed within a case of the DRA antenna 124. Alternatively, the control unit 208 is a component of a computing device that is separate and discrete from the DRA antenna 124 and is communicatively connected to the DRA antenna 124 via a wired or wireless communication path.

The block diagram shows three elements 122A, 122B, 122C for ease of explanation, but the DRA antenna 124 includes more than three elements 122, such as dozens, hundreds, or thousands of the elements 122. For example, the three elements 122A, 122B, 122C in FIG. 2 may represent three of the dozens of elements 122 in the array 120 shown in FIG. 1A. The number of beamforming modules 206 may correspond to the number of elements 122, and each beamforming module 206 is associated with a different corresponding element 122. The beamforming modules 206A, 206B, 206C are associated with corresponding elements 122A, 122B, 122C, respectively. The beamforming modules 206A, 206B, 206C control the corresponding elements 122A, 122B, 122C, such as by controlling the amplitude, phase, frequency, and/or other electrical characteristics of the RF energy radiated by each element 122A, 122B, 122C.

The DRA antenna 124 can be operated to form and transmit a beam, such as the beam 104 shown in FIG. 1. The signal source 202 provides information (e.g., data, sensor signals, etc.) to be conveyed by the beam. The power source 204 powers the DRA antenna 124, such as by distributing electric current (e.g., power) for radiating the elements 122A, 122B, 122C. The radiating elements 122A, 122B, 122C emit respective output signals 210A, 201B, 210C with controlled electrical characteristics. The cumulative output signals 210A, 210B, 210C form the beam. In one or more embodiments, the beam is a multi-channel beam that includes multiple frequency channels.

The signal source 202 provides signals to the beamforming modules 206 that are to be modified and amplified by the beamforming modules 206 prior to being emitted by the elements 122 as the output signals 210. The signal source 202 includes a beam driver 220 that pre-amplifies an input signal. The input signal may be generated onboard the DRA antenna 124 or may be received from a remote device, such as satellite-based or ground-based transmitting antenna. The signal source 202 may include a signal divider 222 that divides the pre-amplified input signal into multiple signals that are distributed to the beamforming modules 206. The signal divider 222 divides the pre-amplified input signal into a number of signals corresponding to the number of elements 122 in the array such that each element 122A, 122B, 122C receives one of the signals.

Each beamforming module 206A, 206B, 206C includes one or more signal modifiers 212 and an amplifier 214. The signal modifiers 212 are controlled to modify electrical characteristics of the signal received by the beamforming module 206 from the signal source 202. For example, the signal modifiers 212 may include one or more phase shifters, attenuators, signal combiners, and/or the like. The attenuator applies a weighting to the received signal to attenuate the signal. The phase shifter applies a phase shift to the received signal. The signals may be attenuated before or after being phase-shifted. The amplifiers 214 power the elements 122. More specifically, the amplifier 214 of each beamforming module 206A, 206B, 206C receives the attenuated and/or phase-shifted signal and amplifies the signal to produce an amplified signal that is provided to the associated element 122A, 122B, 122C. The amplifiers 214 are operably connected to the respective elements 122A, 122B, 122C via conductive paths (e.g., wires). The amplifiers 214 of the beamforming modules 206A, 206B, 206C are powered by the power source 204. Optionally, all of the amplifiers 214 of the beamforming modules 206A, 206B, 206C may be a common type, such that the amplifiers 214 have the same type of circuitry, power ratings, efficiencies, and/or the like.

The power source 204 includes or represents one or more energy storage devices, such as battery cells, capacitors, or the like, and associated control circuitry for distributing electric current (e.g., energy or electric power) to the beamforming modules 206. The control circuitry includes one or more switches, power converters, and/or the like. In an alternative embodiment, the power source 204 includes an electric current-generating machine, such as a generator, an engine, or the like.

In one or more embodiments, the DRA antenna 124 is configured to form a multi-channel beam that has multiple frequency channels. At least some of the elements 122 are controlled to concurrently radiate RF energy at multiple frequency channels, such that the output signal 210 has multiple discrete frequencies. To provide the multiple frequency channels, the beamforming modules 206 optionally may include multiple signal modifiers 212 that correspond to the number of frequency channels. For example, each beamforming module 206 includes multiple phase shifters that shift the received signal in different ways and/or multiple attenuators that attenuate the received signal in different ways to provide the different frequency channels.

In one or more embodiments, the elements 122 are individually controllable to have different energy (e.g., power) allocations among the different frequency channels relative to other elements 122 in the array 120. For example, some elements 122 may receive a greater amount of power (e.g., power setting or power level) for radiating RF energy at a first frequency channel of the multiple frequency channels than other elements 122. The amplifier 214 of each beamforming module 206 allocates power among the different frequency channels according to received instructions. The power allocation indicates a percentage of total received (e.g., distributed) power that is utilized for radiating RF energy at each of the multiple frequency channels. For example, one element 122 may be allocated to radiate a greater amount of RF energy in a first frequency channel of the multiple frequency channels than an amount of RF energy radiated by that element 122 in a second frequency channel and a third frequency channel. As a result, that element 122 is more highly excited in the first frequency channel than in the second and third frequency channels. Optionally, the single amplifier 214 of each beamforming module 206 may be configured to allocate the power to the respective element 122 among the frequency channels. Alternatively, the beamforming modules 206 include multiple amplifiers 214 corresponding to the number of frequency channels, such that the multiple amplifier 214 work in concert to allocate power among the frequency channels to the same element 122.

The control unit 208 includes one or more processors 216 that are configured to operate based on programmed instructions. The control unit 208 includes additional features or components, such as a data storage device (e.g., memory) 218, an input/output (I/O) device (not shown), and/or a wireless communication device (not shown). The memory 218 stores programmed instructions (i.e., software) that dictates the functioning of the one or more processors 216. For example, the memory 218 may store a beam planning algorithm. The control unit 208 (e.g., the one or more processors 216 thereof) generates an excitation plan by implementing the beam planning algorithm. The operations of the DRA antenna 124 are controlled according to the excitation plan.

The beam planning algorithm utilizes various input parameters and/or constraints corresponding to the DRA antenna 124 and the beam that is to be formed. For example, the input parameters regarding the DRA antenna 124 include the number and arrangement of elements 122 in the array 120, the type of amplifiers 214 and other components of the beamforming modules 206, the available power to be distributed among the elements 122 for forming the beam, and the like. The input parameters regarding the beam may include the number of frequency channels, the direction of the beam, the size of the beam, and the like. The constraints that may be applied during the implementation of the beam planning algorithm may include specifying that the elements 122 of at least a group of the array 120 have a substantially uniform power distribution, although how that power to each element 122 is allocated among the frequency channels may be determined by the beam planning algorithm. Optionally, a constraint may designate a power level indicating the amount of power to be distributed to each of the elements 122 in a corresponding group that has a substantially uniform power distribution.

Figure 2A:
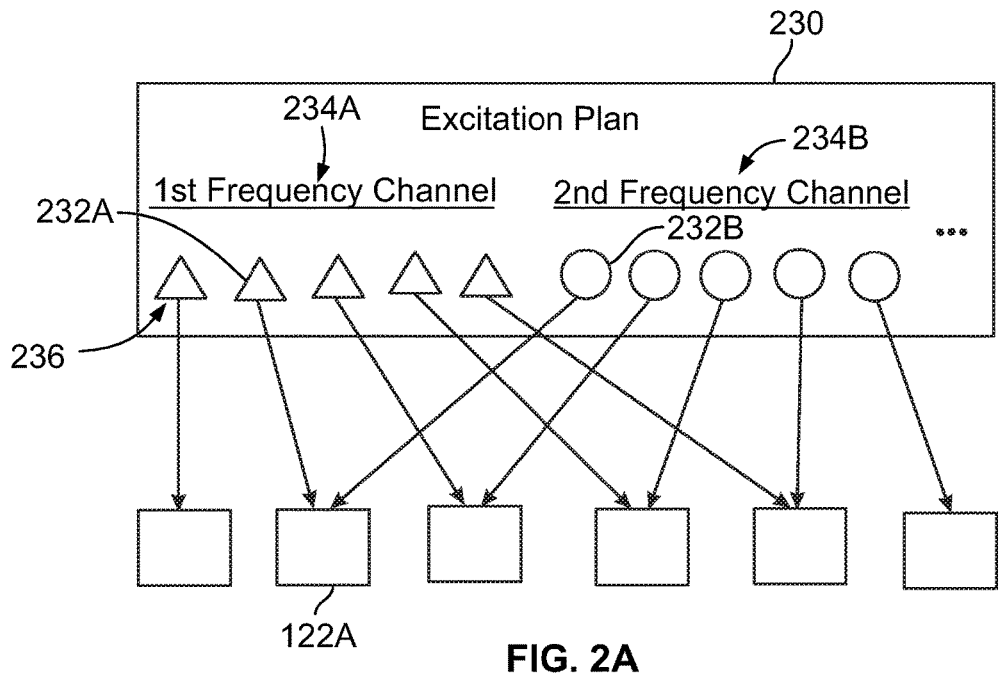
FIG. 2A is a block diagram illustrating an excitation plan and elements of the DRA antenna shown in FIG. 2.

FIG. 2A is a block diagram illustrating the excitation plan 230 and elements 122 of the DRA antenna 124 shown in FIG. 2. The excitation plan 230 generated by the control unit 208 assigns beamforming coefficients 232 to the elements 122. The beamforming coefficients 232 (illustrated in FIG. 2A as triangles and circles) are provided to the beamforming modules 206 (shown in FIG. 2) and designate settings for controlling the beamforming modules 206. The beamforming coefficients 232 designate settings for controlling electrical characteristics of the RF energy radiated by the assigned element 122, such as amplitude (e.g., power) and phase. The beamforming coefficients 232 may be represented as complex numbers, including both amplitude and phase. Optionally, each beamforming coefficient 232 provides the settings for the assigned element 122 to radiate RF energy at one frequency channel. Therefore, the excitation plan assigns multiple beamforming coefficients 232 to the same element 122 for that element 122 to radiate RF energy at multiple frequency channels. For example, a first beamforming coefficient 232A assigned to a first element 122A designates an amount of power and a phase to be used by the first element 122A for radiating RF energy at a first frequency channel 234A of the beam, and a second beamforming coefficient 232B assigned to the first element 122A designates an amount of power and a phase to be used by the first element 122A for radiating RF energy at a second frequency channel 234B of the beam. As a result, the first element 122A radiates RF energy at both the first and second frequency channels 234A, 234B. The operations of the signal modifiers 212 and the amplifiers 214 of the beamforming modules 206 are controlled according to the assigned beamforming coefficients 232.

The excitation plan 230 assigns a corresponding set of beamforming coefficients 232 to the elements 122 in the array 120 for providing each of the frequency channels 234 of the multi-channel beam. For example, the excitation plan assigns a first set 236 of coefficients 232 (shown as triangles in FIG. 2A) to at least some of the elements 122 for those assigned elements 122 to provide the first frequency channel 234A of the multi-channel beam. The excitation plan 230 assigns a second set 238 of coefficients 232 (shown as circles in FIG. 2A) to at least some of the elements 122 for those assigned elements 122 to provide the second frequency channel 234B of the multi-channel beam. As stated above, some of the elements 122 may be assigned a respective beamforming coefficient 232 from multiple different sets 236, 238 for those elements 122 to concurrently radiate RF energy at multiple frequency channels 234, such as the first and second frequency channels 234A, 234B.

In a non-limiting example in which the array 120 includes 100 elements 122 and the multi-channel beam to be formed includes five different frequency channels 234, the excitation plan 230 generated by the control unit 208 assigns five beamforming coefficients 232 to each of the elements 122 in the array 120 for a total of 500 beamforming coefficients.

Optionally, some of the elements 122 may be utilized for radiating RF energy at fewer than the five frequency channels 234, so those elements 122 may be assigned less than five beamforming coefficients 232. By assigning the beamforming coefficients to the elements 122, the excitation plan 230 is configured to control the characteristics of the beam that is formed by the DRA antenna 124, such as the shape, direction, output power and associated efficiency, quality (e.g., gain), and/or the like. It is recognized that the excitation plan 230 may not affect the information conveyed in the beam, which is received by and/or determined by the signal source 202.

Figure 3:
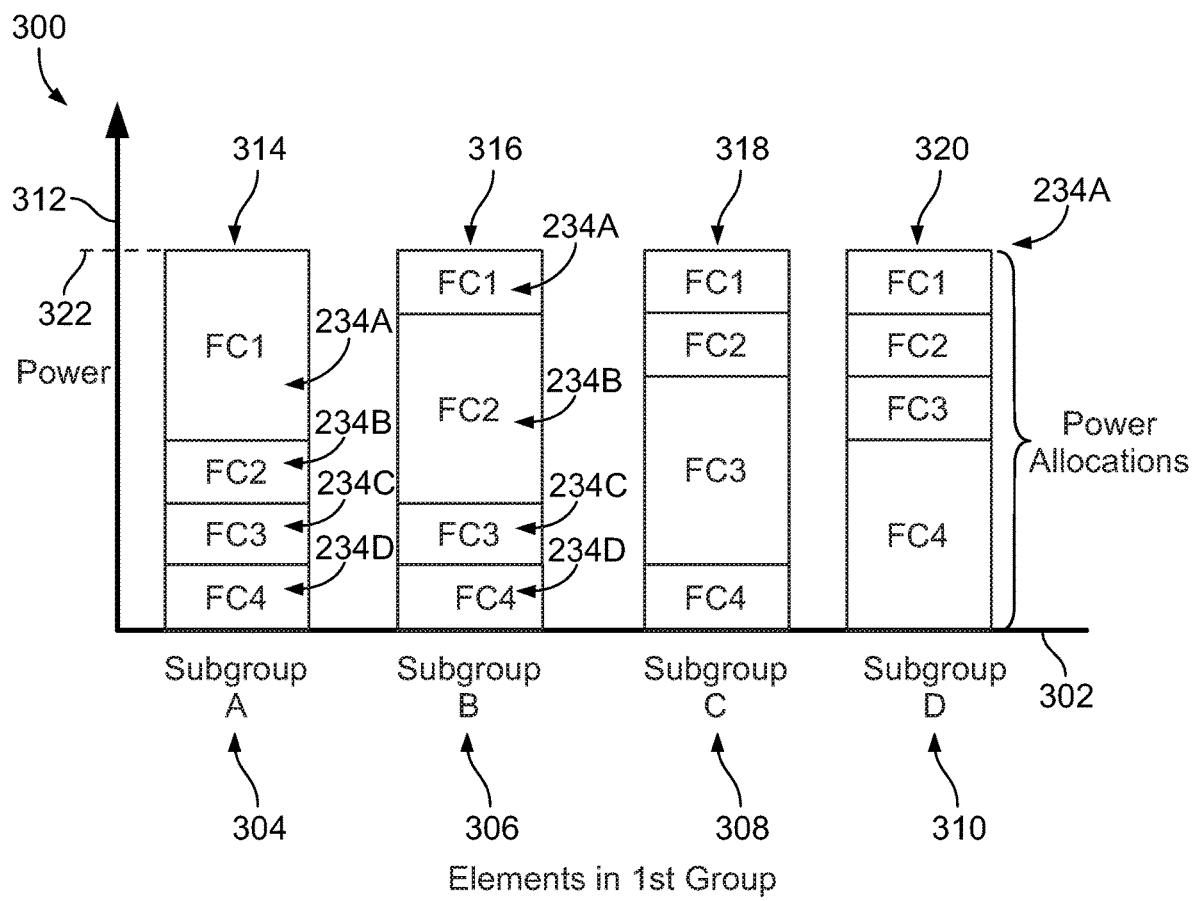
FIG. 3 is a chart showing power distributed to the elements of the array based on an excitation plan according to an embodiment of the present disclosure.

FIG. 3 is a chart 300 showing power distributed to the elements 122 in a first group of the array 120 based on the excitation plan according to an embodiment. The horizontal axis 302 shows multiple subgroups of elements within the first group, including a first subgroup 304 ("Subgroup A"), a second subgroup 306 ("Subgroup B"), a third subgroup 308 ("Subgroup C"), and a fourth subgroup 310 ("Subgroup D"). Each of the subgroups 304, 306, 308, 310 represents one or more elements 122 of the array 120. The one or more elements 122 in each subgroup are separate from the elements in the other subgroups. The first group of elements 122 may represent all of the elements 122 in the array 120 or a subset of the array 120. The vertical axis 312 represents power (e.g., electrical energy).

The chart 300 represents a non-limiting example of how power may be distributed to the elements 122 of the array 120 and allocated among different frequency channels 234 to form a multi-channel beam by the DRA antenna 124 (shown in FIG. 2) according to the excitation plan. In the illustrated example, the multi-channel beam has four frequency channels 234 including the first frequency channel 234A ("FC1"), the second frequency channel 234B ("FC2"), a third frequency channel 234C ("FC3"), and a fourth frequency channel 234D ("FC4"). The excitation plan assigns the beamforming coefficients to the elements 122 in the first group such that each element 122 receives a respective power distribution 314, 316, 318, 320. The one or more elements 122 in the first subgroup 304 receive the power distribution 314, the one or more elements 122 in the second subgroup 306 receive the power distribution 316, the one or more elements 122 in the third subgroup 308 receive the power distribution 318, and the one or more elements 122 in the fourth subgroup 310 receive the power distribution 320. Each power distribution designates the total amount of power provided to the element 122 and also designates an amount of that power to be allocated among the different frequency channels 234A, 234B, 234C, 234D.

In the illustrated embodiment, all of the elements 122 in the first group are utilized to concurrently radiate RF energy at each of the four frequency channels 234A, 234B, 234C, 234D of the multi-channel beam. For example, each of the power distributions 314, 316, 318, 320 includes a respective allocation of power for all four frequency channels 234A, 234B, 234C, 234D. Each beamforming coefficient is associated with a different frequency channel. Therefore, the excitation plan assigns multiple beamforming coefficients to each of the elements 122 in the first group to control the elements 122 to concurrently radiate at multiple different frequencies. For example, the excitation plan may assign four corresponding beamforming coefficients to each of the subgroups 304, 306, 308, 310 of elements 122 for the elements 122 to radiate at the four frequency channels 234A, 234B, 234C, 234D shown in FIG. 3. Each beamforming coefficient designates an amount of power (e.g., a power setting or power level) for the assigned one or more elements 122 to allocate towards radiating at the associated frequency channel (e.g., 234A, 234B, 234C, or 234D). Each of the power distributions 314, 316, 318, 320 represents a sum or total of the individual power amounts designated to the frequency channels 234A, 234B, 234C, 234D by the assigned beamforming coefficients.

For example, a first beamforming coefficient assigned to the first subgroup 304 designates an amount of power for the elements 122 in the first subgroup 304 to allocate towards radiating RF energy at the first frequency channel 234A. A second beamforming coefficient assigned to the first subgroup 304 designates an amount of power for the elements 122 in the first subgroup 304 to allocate towards radiating RF energy at the second frequency channel 234B. Third and fourth beamforming coefficients assigned to the first subgroup 304 designate the power to be allocated to the third and fourth frequency channels 234C, 234D, respectively. The power distribution 314 represents the sum or total of the amounts of power designated to the four individual frequency channels 234A, 234B, 234C, 234D by the first, second, third, and fourth beamforming coefficients assigned to the first subgroup 304.

In one or more embodiments, the excitation plan assigns the beamforming coefficients to the elements 122 to provide a substantially uniform power distribution 324 among the elements 122 in the first group. The power distributed to each of the subgroups 304, 306, 308, and 310 is uniform or balanced such that the heights of the power distributions 314, 316, 318, and 320 in FIG. 3 are equal. The power distributions are referred to as substantially uniform because the power distributed to each of the elements 122 of the first group is within a designated threshold range of the power distributed to all of the other elements 122 in the first group. The designated threshold range accounts for variables such as interference and loss in the electrical power conveyance which causes the power distributed to some elements to be slightly different than the power distributed to other elements. The designated threshold range may be 1%, 2%, 3%, 5%, or the like of the power that is distributed to each element 122. As a result, all of the elements 122 in the first group may receive substantially the same amount of power from the respective amplifiers 214, with any variations in the power between two or more elements 122 being within the threshold range. The substantially uniform power distribution 324 enables the DRA antenna 124 (shown in FIG. 2) to operate with desirable power efficiency because all of the elements 122 representing the first group are contributing to the formation of each of the frequency channels of the beam. In an embodiment in which the first group represents all of the elements 122 in the array, the excitation plan provides the substantially uniform power distribution 324 among all elements 122 in the array.

In the illustrated example, all four subgroups 304, 306, 308, and 310 receive an amount of power at a power level 322 (also referred to herein as a first power level 322). The substantially uniform power distribution 324 among the elements 122 is at the first power level 322. In a non-limiting example, the power level 322 is within a range of 0.1 to 10 watts. Optionally, the power level 322 may be a output value determined by the beam planning algorithm, or the power level 322 may be an input constraint. For example, the first power level may be a predetermined power level that is input prior to generating the excitation plan and utilized by the beam planning algorithm to generate the excitation plan.

In one or more embodiments, the excitation plan assigns the beamforming coefficients to the elements 122 such that at least some of the elements 122 in the first group have different allocations of power among the multiple frequency channels of the beam than other elements 122 in the first group. For example, the one or more elements 122 in one subgroup are controlled to allocate the received power differently among the multiple frequency channels than the one or more elements 122 in the other subgroups. In the illustrated embodiment, all four power distributions 314, 316, 318, and 320 have a different allocation of power among the four frequency channels.

For example, the power distribution 314 for the first subgroup 304 allocates more power to the first frequency channel 234A than to each of the other frequency channels 234B, 234C, 234D. For example, approximately half of the total power distributed to the first subgroup 304 is allocated to radiating RF energy at the first frequency channel 234A, and the other half of the power distributed to the first subgroup 304 is approximately equally partitioned among the second, third, and fourth frequency channels 234B, 234C, 234D. In the power distribution 316 for the second subgroup 306, more power is allocated to the second frequency channel 234B than to each of the other frequency channels 234A, 234C, 234D. For example, approximately half of the power is allocated to radiating RF energy at the second frequency channel 234B, and the other half is approximately equally partitioned among the first, third, and fourth channels 234A, 234C, 234D. Similarly, the power distribution 318 for the third subgroup 308 allocates approximately half of the received power to radiating RF energy at the third frequency channel 234C, and the power distribution 320 for the fourth subgroup 310 allocates approximately half of the received power to radiating RF energy at the fourth frequency channel 234D.

In the illustrated embodiment, although all of the elements 122 radiate at the first frequency channel 234A, the one or more elements 122 in the first subgroup 304 radiate with greater energy or intensity at the first frequency channel 234A than the energy or intensity at which the elements 122 in the other subgroups 306, 308, 310 radiate at the first frequency channel 234A. Therefore, the elements 122 of the first subgroup 304 contribute more to the formation of the first frequency channel 234A of the multi-channel beam than the elements 122 in the other subgroups 306, 308, 310. Similarly, the elements 122 of the second subgroup 306 provide the greatest contribution to the formation of the second frequency channel 234B of the multi-channel beam, the elements 122 of the third subgroup 308 provide the greatest contribution to the formation of the third frequency channel 234C of the multi-channel beam, and the elements 122 of the fourth subgroup 310 provide the greatest contribution to the formation of the fourth frequency channel 234D of the multi-channel beam. Generating the excitation plan to have at least some of the elements 122 allocate power differently among the multiple frequency channels 234A, 234B, 234C, 234D, even though the total power distributed to each element 122 may be uniform, may enable the DRA antenna 124 (shown in FIG. 2) to efficiently form the multi-channel beam without sacrificing quality. For example, the variance in the power allocations may result in the formation of a multi-channel beam with an antenna gain that is sufficiently high to meet or exceed standards.

Figure 4:
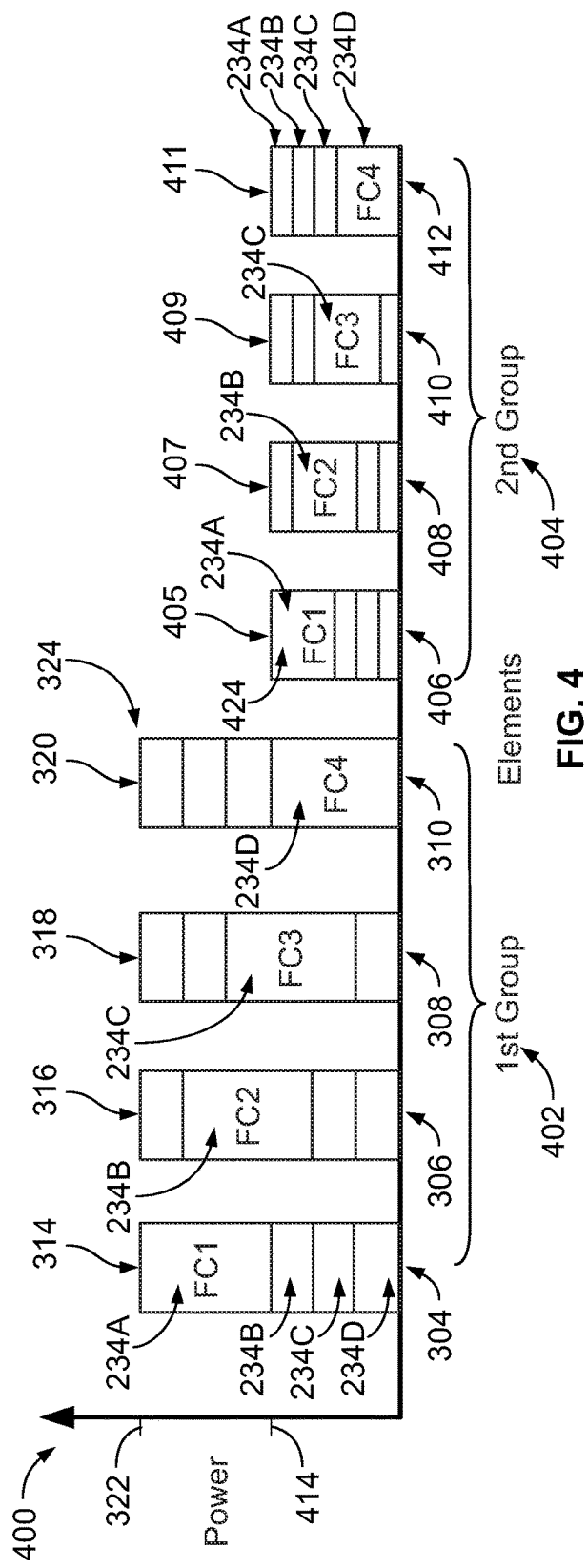
FIG. 4 is a chart showing power distributed to the elements of the array based on an excitation plan according to a second embodiment of the present disclosure.

FIG. 4 is a chart 400 showing power distributed to the elements 122 of the array 120 based on the excitation plan according to a second embodiment. In the illustrated embodiment, the elements 122 are partitioned into at least a first group 402 and a second group 404. Each group 402, 404 includes multiple subgroups of one or more elements 122. The first group 402 includes the four subgroups 304, 306, 308, 310 shown in FIG. 3. The excitation plan assigns the beamforming coefficients to the elements 122 in the first group 402 such that the subgroups 304, 306, 308, 310 receive the respective power distributions 314, 316, 318, 320, as shown in FIG. 3, for allocating power among the four frequency channels 234A, 234B, 234C, 234D. In the illustrated embodiment, the elements 122 in the second group 404 are also utilized for radiating RF energy at the four frequency channels 234A, 234B, 234C, 234D. For example, the excitation plan assigns a fifth power distribution 405 to a first subgroup 406 of the second group 404, a sixth power distribution 407 to a second subgroup 408 of the second group 404, a seventh power distribution 409 to a third subgroup 410 of the second group 404, and an eighth power distribution 411 to a fourth subgroup 412 of the second group 404.

In one or more embodiments, the excitation plan assigns beamforming coefficients to the second group 404 to provide a uniform power distribution 424 among the elements 122 in the second group 404. For example, all four subgroups 406, 408, 410, 412 receive the same amount of power, as indicated by the four power distributions 405, 407, 409, 411 having the same height in FIG. 4. The power distributed to the elements 122 in the second group 404 is a second power level 414. Thus, all of the elements 122 in the second group 404 are distributed total power equal to the second power level 414 within the designated threshold range of variance (e.g., 1%, 2%, 3%, 5%, or the like). The second power level 414 is different than the first power level 322 received by each of the elements 122 in the first group 402. Therefore, the first group 402 has a substantially uniform power distribution 324 and the second group 404 also has a substantially uniform power distribution 424, but at different power levels. In the illustrated embodiment, the second power level 414 is less than the first power level 322 such that the elements 122 in the second group 404 receive less power than the elements 122 in the first group 402.

Figure 5:
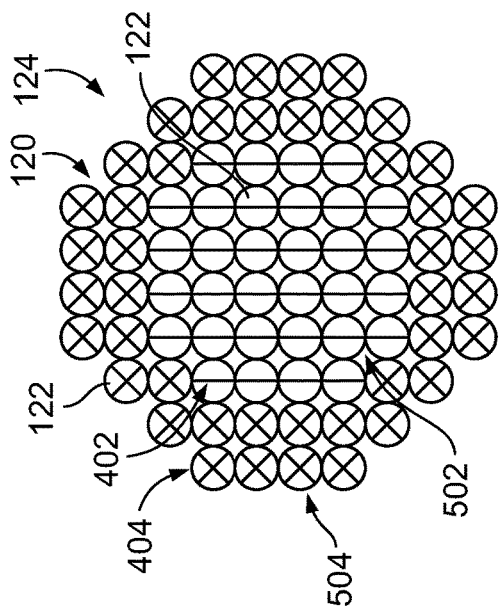
FIG. 5 illustrates the array of elements of the DRA antenna according to the embodiment shown in FIG. 4.

FIG. 5 illustrates the array 120 of elements 122 of the DRA antenna 124 according to the embodiment shown in FIG. 4. In the illustrated embodiment, the elements 122 in the first group 402 are disposed side by side within a central area 502 of the array 120 and are identified as the x-marked elements. The elements 122 in the second group 404 are disposed side by side within a peripheral area 504 of the array 120 and are identified as marked by a single line. The peripheral area 504 surrounds the central area 502. The elements 122 in the second group 404 surround the elements 122 in the first group 402. The second group 404 defines a perimeter of the array 120. As shown in FIG. 4, the power distributed to the elements 122 in the first group 402 is greater than the power distributed to the elements 122 in the second group 404 such that the more centrally-located elements 122 are more highly energized or excited than the peripheral elements 122.

The arrangement shown in FIG. 5 is an example of a step taper. The step taper is selected by designating which elements 122 in the array are classified as the first, or central, group 402 and which elements 122 in the array are classified as the second, or peripheral, group 404. The excitation plan may be generated based on this input information. Optionally, the power levels 322 and 414 for the two groups 402, 404 may be determined by the beam forming algorithm or may be predetermined values that are input for use as a constraint by the beam forming algorithm.

Referring now back to FIG. 4, the beamforming coefficients are assigned to the elements 122 in the second group 404 such that at least some of the elements 122 have different allocations of power among the frequency channels of the beam than other elements 122 in the second group 404. For example, the distributed power is allocated differently among the frequency channels 234A, 234B, 234C, 234D for the different subgroups 406, 408, 410, 412. In the illustrated embodiment, the first subgroup 406 allocates more power to radiating RF energy at the first frequency channel 234A than the power allocated to the first frequency channel 234A by the other subgroups 408, 410, 412. The second subgroup 408 allocates the most power to the second frequency channel 234B out of the elements 122 in the second group 404, the third subgroup 410 allocates the most power to the third frequency channel 234C out of the elements 122 in the second group 404, and the fourth subgroup 412 allocates the most power to the fourth frequency channel 234D out of the elements 122 in the second group 404. As described above, controlling the elements 122 in the second group 404 to allocate different amounts of power to the different frequency channels 234A, 234B, 234C, 234D may enable high quality beam formation.

Figure 6:
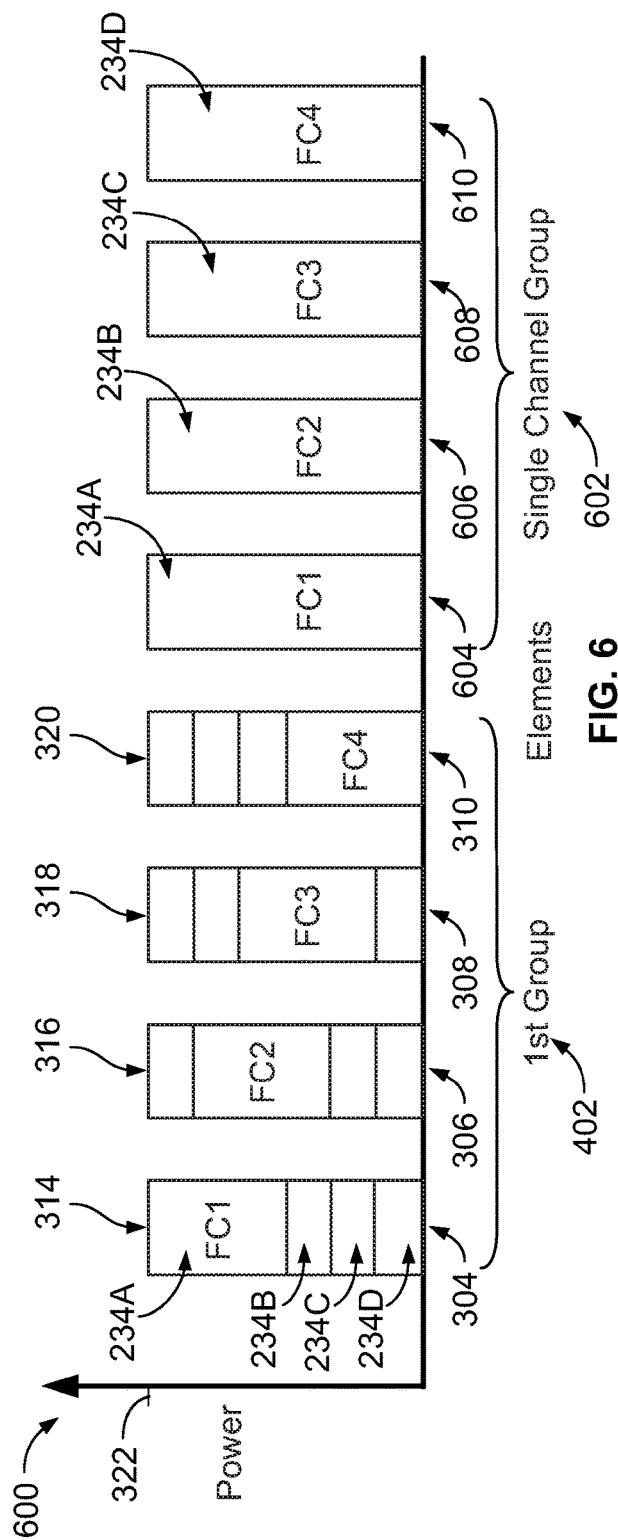
FIG. 6 is a chart showing power distributed to the elements of the array based on an excitation plan according to a third embodiment of the present disclosure.

FIG. 6 is a chart 600 showing power distributed to the elements 122 of the array 120 based on the excitation plan according to a third embodiment. In the illustrated embodiment, the elements 122 are partitioned into the first group 402 and a single channel group 602. Each group 402, 602 includes multiple subgroups of one or more elements 122. The first group 402 includes the four subgroups 304, 306, 308, 310 that are assigned the respective power distributions 314, 316, 318, 320, as shown in FIGS. 3 and 4, for allocating power among the four frequency channels 234A, 234B, 234C, 234D. In one or more embodiments, the elements 122 in the single channel group 602 are each only utilized for radiating RF energy at one the four frequency channels 234A, 234B, 234C, 234D. For example, the excitation plan assigns only one beamforming coefficient to each of the elements 122 in the single channel group 602. All of the power distributed to these single-channel elements 122 is exclusively utilized for radiating RF energy at the specific frequency channel 234 designated by the assigned beamforming coefficient. In the illustrated embodiment, a first subgroup 604 of one or more elements 122 in the single channel group 602 is assigned a beamforming coefficient for radiating RF energy at the first frequency channel 234A. A second subgroup 606 in the single channel group 602 is assigned a beamforming coefficient for radiating RF energy at the second frequency channel 234B. Similarly, a third subgroup 608 in the single channel group 602 is assigned to radiate RF energy at the third frequency channel 234C, and a fourth subgroup 610 in the single channel group 602 is assigned to radiate RF energy at the fourth frequency channel 234D. In the illustrated embodiment, the power distributed to the elements 122 in the single channel group 602 (also referred to herein as single-channel elements) is equal to the power distributed to the elements 122 in the first group 402 (e.g., the first power level 322), but the single-channel elements receive more or less power than the elements 122 in the first group 402 in alternative embodiments.

Figure 7:
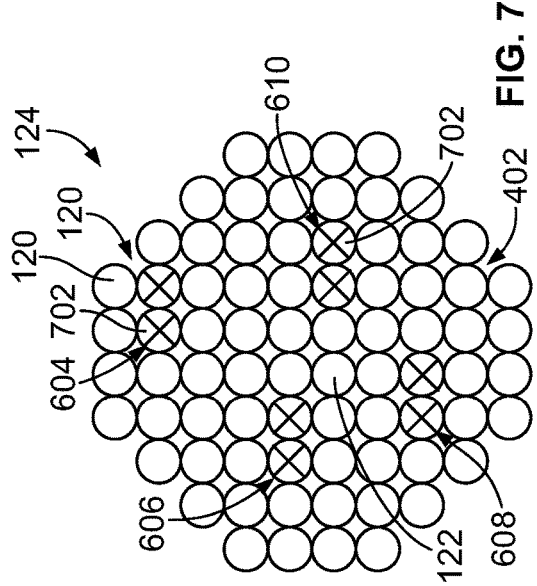
FIG. 7 illustrates the array of elements of the DRA antenna according to the embodiment shown in FIG. 6.

FIG. 7 illustrates the array 120 of elements 122 of the DRA antenna 124 according to the embodiment shown in FIG. 6. The single-channel elements 702 are spaced apart at different locations along the array 120. In the array 120, different pairs of two single-channel elements 702 represent the first subgroup 604, the second subgroup 606, the third subgroup 608, and the fourth subgroup 610. The subgroups 604, 606, 608, 610 are spaced apart from each other such that one or more elements 122 from the first group 402 separate the different subgroups 604, 606, 608, 610. The determination of which elements 122 to designate as single-channel elements 702 (e.g., the locations of the single-channel elements 702) and how many single-channel elements 702 to utilize for each subgroup 604, 606, 608, 610 may be determined by the control unit 208 by implementing the beam planning algorithm, or may be predetermined and input into the beam planning algorithm as a constraint. The arrangement shown in FIG. 7 is an example of exclusive partitioning by designating certain elements for use in forming only a single specific frequency channel of the multi-channel beam, which may improve the quality of the beam by increasing the signal-to-noise ratio.

Although the exclusive partitioning of FIGS. 6 and 7 and the step taper of FIGS. 4 and 5 are described separately, another embodiment of the present disclosure combines the exclusive partitioning with the step taper. For example, the elements of the array may be partitioned into a first group 402, a second group 404, and a single channel group 602. The elements of the array may be partitioned into any number of groups and subgroups. The groups 402, 404, 602 shown in FIGS. 4 through 7 are merely non-limiting example embodiments.

Figure 8:
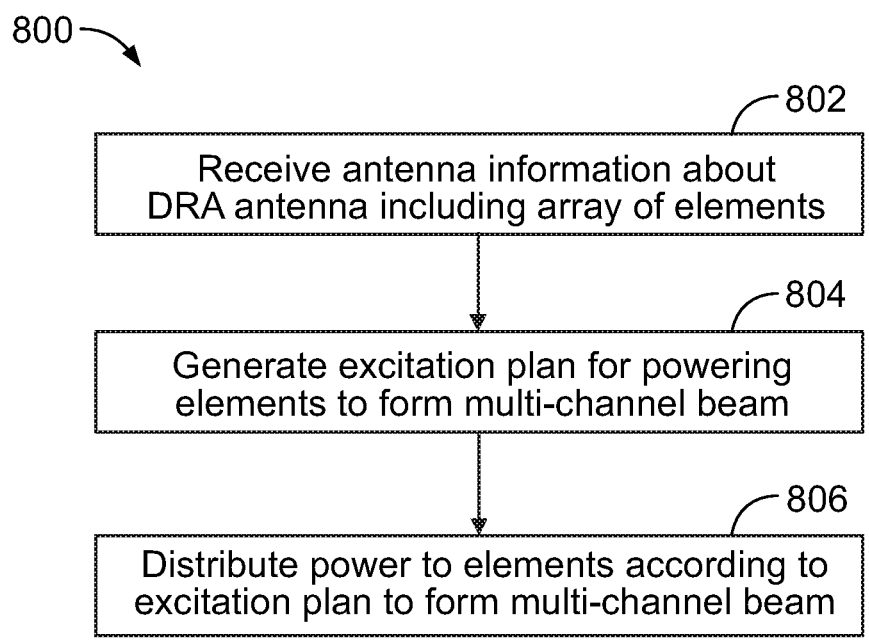
FIG. 8 is a flow chart of a method for controlling a DRA antenna to form a multi-channel beam according to an embodiment of the present disclosure.

FIG. 8 is a flow chart of a method 800 for controlling a DRA antenna to form a multi-channel beam according to an embodiment of the present disclosure. The method 800 may be performed in whole, or at least in part, by the control unit 208 (e.g., the one or more processors 216 thereof) of the DRA antenna 124 shown in FIG. 2. Various embodiments of the method 800 may include additional steps not shown in FIG. 8, fewer steps than shown in FIG. 8, and/or different steps than the steps shown in FIG. 8. At 802, antenna information about a DRA antenna is received. The DRA antenna includes an array of elements configured to radiate RF energy to form a beam having multiple frequency channels (e.g., a multi-channel beam). The antenna information identifies a number and arrangement of the elements in the array. The antenna information may also identify other components of the DRA antenna including amplifiers. The antenna information may be accessed from a database, received from another device via a communication, or input via a user. Additional information may be received including information about the beam that is to be formed, such as the anticipated direction of the beam, size of the beam, shape of the beam, and/or the like.

At 804, an excitation plan is generated for powering the elements to form the beam based on at least the antenna information subject to beam quality constraints. The excitation plan assigns multiple corresponding beamforming coefficients to each element in a first group of the elements. Each beamforming coefficient designates an amount of power allocated to the assigned element for radiating RF energy at an associated frequency channel of the beam. The excitation plan is generated to provide a uniform power distribution among the elements in the first group. The excitation plan is generated such that at least some of the elements in the first group have different allocations of power among the multiple frequency channels of the beam than other elements in the first group. For example, the excitation plan provides a uniform power distribution among the elements such that a sum of power allocated among the multiple frequency channels for radiating by a first element in the first group is within a designated threshold range of a sum of power allocated among the multiple frequency channels for radiating by a second element in the first group. The excitation plan is generated to provide different allocations of power among the frequency channels of the beam such that a first element in the first group is allocated a greater amount of power for radiating at a first frequency channel of the beam than an amount of power allocated to a second element in the first group for radiating at the first frequency channel.

At 806, power is distributed to the elements according to the excitation plan to form the beam having multiple frequency channels. The power is received from a power source, such as one or more battery cells, a generator, an alternator, or the like. For example, amplifiers individually power the elements based on the excitation plan to cause the elements to radiate RF energy, and the combined RF energy forms the multi-channel beam.

Optionally, generating the excitation plan includes partitioning the elements of the direct radiating array antenna into the first group and a second group. The excitation plan is generated to assign beamforming coefficients to the elements in the second group to provide a uniform power distribution among the elements in the second group at a different power level than a power level distributed to the elements in the first group.

Optionally, generating the excitation plan includes assigning only one corresponding beamforming coefficient to each of multiple elements of the direct radiating array antenna that define a single channel group. Each element in the single channel group is controlled to radiate RF energy at only one of the frequency channels of the beam according to the assigned beamforming coefficient.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   a direct radiating array antenna including plurality of elements disposed in an array, the elements configured to radiate radiofrequency (RF) energy to form a beam having multiple frequency channels; and
   one or more processors configured to generate an excitation plan for powering the elements to form the beam, the excitation plan assigning multiple corresponding beamforming coefficients to each element in a first group of the elements and assigning multiple corresponding beamforming coefficients to each element in a second group of the elements, each beamforming coefficient designating power allocated to the assigned element for radiating RF energy at an associated frequency channel of the beam,
   wherein the excitation plan assigns the beamforming coefficients to provide a substantially uniform power distribution among the elements in the first group, and at least some of the elements in the first group have different allocations of power among the multiple frequency channels of the beam than other elements in the first group,
   wherein the excitation plan assigns the beamforming coefficients to the elements in the second group to provide a substantially uniform power distribution among the elements in the second group at a different power level than a power level distributed to the elements in the first group.

2. The system of claim 1, wherein the excitation plan assigns the beamforming coefficients to provide the substantially uniform power distribution such that a sum of power allocated among the multiple frequency channels for radiating by a first element in the first group is within a designated threshold range of a sum of power allocated among the multiple frequency channels for radiating by a second element in the first group.

3. The system of claim 1, wherein the excitation plan provides different allocations of power among the frequency channels such that a first element in the first group is allocated a greater power for radiating at a first frequency channel of the beam than the power allocated to a second element in the first group for radiating at the first frequency channel.

4. The system of claim 1, wherein at least some of the elements are each operably connected to a respective amplifier that powers the respective element to radiate the RF energy.

5. The system of claim 4, wherein the amplifiers operably connected to the elements are a common type.

6. The system of claim 1, wherein the multiple corresponding beamforming coefficients are assigned to each element in the first group for each of the elements in the first group to concurrently radiate RF energy at the multiple frequency channels of the beam.

7. The system of claim 1, wherein the power level distributed to the elements in the first group is a predefined power level that is distributed to each of the elements in the first group.

8. The system of claim 1, wherein the excitation plan assigns multiple beamforming coefficients to each of the elements in the second group, and the beamforming coefficients are assigned such that at least some of the elements in the second group have different allocations of power among the multiple frequency channels of the beam than other elements in the second group.

9. The system of claim 1, wherein the elements in the first group are disposed side by side within a central area of the array and the elements in the second group are disposed side by side within a peripheral area of the array surrounding the central area.

10. The system of claim 9, wherein the power level distributed to the elements in the first group is greater than the power level distributed to the elements in the second group.

11. The system of claim 1, wherein the excitation plan assigns only one corresponding beamforming coefficient to each of multiple elements that define a single channel group, each element in the single channel group controlled to radiate RF energy at only one of the frequency channels of the beam according to the assigned beamforming coefficient.

12. The system of claim 11, wherein one or more elements in the single channel group that are assigned to radiate RF energy at a first frequency channel of the beam are spaced apart along the array from the elements in the single channel group assigned to radiate RF energy at other frequency channels of the beam.

13. A method of controlling a direct radiating array antenna, the method comprising:
receiving antenna information about the direct radiating array antenna, the antenna information identifying a number and arrangement of elements in the direct radiating array antenna, the elements configured to radiate radiofrequency (RF) energy to form a beam having multiple frequency channels;
partitioning the elements of the direct radiating array antenna into a first group of elements and a second group of elements; and
generating, via one or more processors, an excitation plan for powering the elements in the first group and the second group to form the beam based on the antenna information, the excitation plan assigning multiple corresponding beamforming coefficients to each element in the first group and assigning multiple corresponding beamforming coefficients to each element in the second group, each beamforming coefficient designating power allocated to the assigned element for radiating RF energy at an associated frequency channel of the beam,
wherein the excitation plan is generated to provide a substantially uniform power distribution among the elements in the first group, and at least some of the elements in the first group have different allocations of power among the multiple frequency channels of the beam than other elements in the first group,
wherein the excitation plan is generated to assign the beamforming coefficients to the elements in the second group to provide a substantially uniform power distribution among the elements in the second group at a different power level than a power level distributed to the elements in the first group.

14. The method of claim 13, further comprising distributing power to the elements according to the excitation plan to form the beam having multiple frequency channels.

15. The method of claim 13, wherein the excitation plan is generated to provide the substantially uniform power distribution such that a sum of power allocated among the multiple frequency channels for radiating by a first element in the first group is within a designated threshold range of a sum of power allocated among the multiple frequency channels for radiating by a second element in the first group.

16. The method of claim 13, wherein the excitation plan is generated to provide different allocations of power among the frequency channels of the beam such that a first element in the first group is allocated a greater power for radiating at a first frequency channel of the beam than the power allocated to a second element in the first group for radiating at the first frequency channel.

17. The method of claim 13, wherein generating the excitation plan includes assigning only one corresponding beamforming coefficient to each of multiple elements of the direct radiating array antenna that define a single channel group, each element in the single channel group controlled to radiate RF energy at only one of the frequency channels of the beam according to the assigned beamforming coefficient.

18. A direct radiating array antenna comprising:
a plurality of elements disposed in an array, the elements configured to radiate radiofrequency (RF) energy to form a beam having multiple frequency channels; and
one or more processors configured to generate an excitation plan for powering the elements to form the beam, the excitation plan assigning one or more beamforming coefficients to each of the elements in the array, each beamforming coefficient designating power allocated to the assigned element for radiating RF energy at an associated frequency channel,
wherein the excitation plan assigns multiple beamforming coefficients to a first element in the array and multiple beamforming coefficients to a second element in the array to enable each of the first and second elements to concurrently radiate RF energy at least at a first frequency channel and a second frequency channel of the beam,
wherein the first element is allocated a greater amount of power for radiating at the first frequency channel than an amount of power allocated to the second element for radiating at the first frequency channel, and a total power distributed to the first element for radiating RF energy is within a designated threshold range of a total power distributed to the second element,
wherein the excitation plan assigns only one beamforming coefficient to a third element in the array and only one beamforming coefficient to a fourth element in the array, where the beamforming coefficient assigned to the third element is different than the beamforming coefficient assigned to the fourth element, wherein the beamforming coefficients are assigned to the third and fourth elements to control the third element to radiate RF energy at only the first frequency channel and to control the fourth element to radiate RF energy at only the second frequency channel.

19. The direct radiating array antenna of claim 18, wherein the first and second elements are within a first group of elements, and wherein the excitation plan partitions the elements of the array into the first group, a second group of multiple elements, and the single channel group, wherein the excitation plan assigns beamforming coefficients to the elements in the second group to provide a substantially uniform power distribution among the elements in the second group at a different power level than a power level distributed to the elements in the first group.

20. The direct radiating array antenna of claim 18, wherein the third element is one of multiple elements in a first subgroup assigned to radiate RF energy at only the first frequency channel of the beam, and the fourth element is one of multiple elements in a second subgroup assigned to radiate RF energy at only the second frequency channel of the beam, the elements in the first subgroup spaced apart along the array from the elements in the second subgroup.

* * * * *